(12) United States Patent
van Kimmenade et al.

(10) Patent No.: US 10,822,552 B2
(45) Date of Patent: Nov. 3, 2020

(54) PROCESS FOR PRODUCING MONOAROMATIC HYDROCARBONS FROM A HYDROCARBON FEED COMPRISING POLYAROMATICS

(71) Applicant: SABIC GLOBAL TECHNOLOGIES B.V., Bergen op Zoom (NL)

(72) Inventors: Emiel van Kimmenade, Geleen (NL); Luis Aramburo, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/079,785

(22) PCT Filed: Feb. 21, 2017

(86) PCT No.: PCT/EP2017/053866
§ 371 (c)(1),
(2) Date: Aug. 24, 2018

(87) PCT Pub. No.: WO2017/148735
PCT Pub. Date: Sep. 8, 2017

(65) Prior Publication Data
US 2019/0055479 A1  Feb. 21, 2019

(30) Foreign Application Priority Data
Mar. 1, 2016 (EP) .................................. 16157968

(51) Int. Cl.
*C10G 45/50* (2006.01)
*B01J 35/00* (2006.01)
(Continued)

(52) U.S. Cl.
CPC ............ *C10G 45/50* (2013.01); *B01J 23/882* (2013.01); *B01J 23/883* (2013.01); *B01J 23/888* (2013.01);
(Continued)

(58) Field of Classification Search
CPC ............ C10G 45/50; C10G 2300/1096; B01J 37/0018; B01J 37/009; B01J 37/0036;
(Continued)

(56) References Cited

U.S. PATENT DOCUMENTS

| | | | |
|---|---|---|---|
| 2,479,110 A | 8/1949 | Haensel et al. | |
| 2,604,438 A | 7/1952 | Bannerot | |

(Continued)

FOREIGN PATENT DOCUMENTS

| | | |
|---|---|---|
| CN | 1207117 A | 2/1999 |
| CN | 1253989 A | 5/2000 |

(Continued)

OTHER PUBLICATIONS

Scherzer et al. ("Hydrocracking Science and Technology" Crc Press, 1996, p. 63) (Year: 1996).*

(Continued)

*Primary Examiner* — In Suk C Bullock
*Assistant Examiner* — Jason Y Chong
(74) *Attorney, Agent, or Firm* — Cantor Colburn LLP

(57) ABSTRACT

The present invention relates to a process for producing monoaromatic hydrocarbons from a hydrocarbon feed comprising polyaromatics, the process comprising contacting the feed at process conditions with a catalyst comprising a mixture of zeolite Y and a hydrogenation catalyst comprising one or more hydrogenation metals on a solid catalyst support.

18 Claims, 1 Drawing Sheet

(51) Int. Cl.

| | | |
|---|---|---|
| B01J 23/888 | (2006.01) | |
| B01J 37/00 | (2006.01) | |
| B01J 37/04 | (2006.01) | |
| B01J 29/10 | (2006.01) | |
| B01J 23/882 | (2006.01) | |
| B01J 29/14 | (2006.01) | |
| B01J 27/051 | (2006.01) | |
| B01J 23/883 | (2006.01) | |
| B01J 29/12 | (2006.01) | |
| B01J 27/049 | (2006.01) | |
| B01J 29/16 | (2006.01) | |
| B01J 23/89 | (2006.01) | |
| B01J 29/08 | (2006.01) | |
| B01J 37/08 | (2006.01) | |
| B01J 37/18 | (2006.01) | |

(52) U.S. Cl.
CPC ....... *B01J 23/8885* (2013.01); *B01J 23/8993* (2013.01); *B01J 27/049* (2013.01); *B01J 27/0515* (2013.01); *B01J 29/084* (2013.01); *B01J 29/106* (2013.01); *B01J 29/126* (2013.01); *B01J 29/146* (2013.01); *B01J 29/166* (2013.01); *B01J 35/0006* (2013.01); *B01J 37/009* (2013.01); *B01J 37/0018* (2013.01); *B01J 37/0036* (2013.01); *B01J 37/04* (2013.01); *B01J 37/08* (2013.01); *B01J 37/18* (2013.01); *B01J 2029/081* (2013.01); *B01J 2229/16* (2013.01); *B01J 2229/42* (2013.01); *C10G 2300/1096* (2013.01)

(58) Field of Classification Search
CPC ... B01J 37/04; B01J 37/08; B01J 37/18; B01J 29/084; B01J 23/882; B01J 23/883; B01J 23/888; B01J 23/8885; B01J 23/8993; B01J 29/106; B01J 29/126; B01J 29/146; B01J 29/166; B01J 27/049; B01J 27/0515; B01J 35/0006; B01J 2029/081; B01J 2229/16; B01J 2229/42

See application file for complete search history.

(56) References Cited

U.S. PATENT DOCUMENTS

| | | | | |
|---|---|---|---|---|
| 3,853,747 | A * | 12/1974 | Young | B01J 29/076 208/111.1 |
| 4,305,808 | A | 12/1981 | Bowes et al. | |
| 4,440,871 | A | 4/1984 | Lok et al. | |
| 4,738,766 | A * | 4/1988 | Fischer | C10G 47/16 208/111.2 |
| 5,112,473 | A | 5/1992 | Dai et al. | |
| 5,468,368 | A * | 11/1995 | Baker, Jr. | C10G 47/16 208/111.35 |
| 5,593,570 | A * | 1/1997 | Habib | B01J 29/146 208/108 |
| 6,444,865 | B1 | 9/2002 | Barre et al. | |
| 7,513,988 | B2 | 4/2009 | Oballa et al. | |
| 8,962,900 | B2 | 2/2015 | Kim et al. | |
| 2006/0231464 | A1 | 10/2006 | Brignac et al. | |
| 2007/0062848 | A1 | 3/2007 | Oballa et al. | |
| 2013/0085311 | A1* | 4/2013 | Youn | C10G 51/04 585/651 |
| 2015/0166434 | A1 | 6/2015 | Ward | |
| 2017/0152447 | A1* | 6/2017 | Housmans | C10G 47/00 |
| 2019/0023996 | A1 | 1/2019 | Van Kimmenade et al. | |

FOREIGN PATENT DOCUMENTS

| | | | |
|---|---|---|---|
| CN | 1488726 | A | 4/2004 |
| CN | 1667093 | A | 9/2005 |
| CN | 101619235 | A | 1/2010 |
| CN | 103121896 | A | 5/2013 |
| CN | 103773480 | A | 5/2014 |
| EP | 0247678 | A2 | 12/1987 |
| EP | 0303332 | A1 | 2/1989 |
| EP | 0512652 | A1 | 11/1992 |
| EP | 1779929 | A1 | 5/2007 |
| EP | 2258476 | A1 | 12/2010 |
| WO | 9321284 | A1 | 10/1993 |
| WO | 9838265 | A1 | 9/1998 |
| WO | 2004047988 | A1 | 6/2004 |
| WO | 2015128019 | A1 | 9/2015 |
| WO | 2017144438 | A1 | 8/2017 |

OTHER PUBLICATIONS

A. Corma, "Inorganic Solid Acids and Their Use in Acid-Catalyzed Hydrocarbon Reactions" Chemical Reviews vol. 95, No. 3, 1995, pp. 559-614.
Brent M. Lok et al., "Silicoaluminophosphate Molecular Sieves: Another New Class of Microporous Crystalline Inorganic Solids", Journal of Americal Chemical Society, vol. 106, 1984, pp. 6092-6093.
European Search Report issued in EP Application No. 16157968 dated Aug. 30, 2016, 4 pages.
Hermann K. Beyer "Dealumination Techniques for Zeolites" Post-Synthesis Modification I, Molecular Sieves (Science and Technology), vol. 3. Springer, Berlin, Heidelberg, 2002, pp. 203-255.
Huaijun Ma et al., "Coupled hydrogenation and ring opening of tetralin on potassium modified Pt/USY catalysts", Catalysis Letters, vol. 116, Nos. 3-4, Aug. 2007, pp. 149-154.
International Search Report issued in Application No. PCT/EP2017/053865; International Filing Date: Feb. 21, 2017; dated May 18, 2017; 6 pages.
International Search Report issued in Application No. PCT/EP2017/053866; International Filing Date: Feb. 21, 2017; dated Apr. 18, 2017; 7 pages.
Joo-Il Park et al., "Hydro-conversion of 1-methyl naphthalene into (alkyl)benzenes over alumina-coated USY zeolite-supported NiMoS catalysts", Fuel, vol. 90, 2011, pp. 182-189.
Jovana Zecevic et al., "Heterogeneities of the Nanostructure of Platinum/Zeolite Y Catalysts Revealed by Electron Technology," ACS Nano, vol. 7, No. 4, 2013, pp. 3698-3705.
Karge et al., "Post Synthesis Modification I," Molecular Sieves; 2002, pp. 204-255, vol. 3.
Kirk-Othmer Encyclopedia of Chemical Technology, "Molecular Sieves," (2006) pp. 811-853, Fifth Edition, vol. 16.
Krijn P. De Jong et al., "Zeolite Y Crystals with Trimodal Porosity as Ideal Hydrocracking Catalysts," Angew. Chem. Int. Ed. 2010, vol. 49, pp. 10074-10078.
M. Chareonpanich et al., "Effect of catalysts on yields of monocyclic aromatic hydrocarbons in hydrocracking of coal volatile matter", Fuel, vol. 74, No. 11, 1995, pp. 1663-1640.
Ma et al. "Coupled hydrogenation and ring opening of tetralin on potassium modified Pt/USY catalysts" vol. 116, Nos. 3-4, Aug. 2007, pp. 149-154.
Ocean Cheung et al., "Silicoaluminophosphates as CO2 sorbents", Microporous and Mesoporous Materials, vol. 156, 2012, pp. 90-96.
Written Opinion of the International Searching Authority issued in International Application No. PCT/EP2017/053865; International Filing Date: Feb. 21, 2017; dated May 18, 2017; 9 pages.
Written Opinion of the International Searching Authority issued in International Application No. PCT/EP2017/053866; International Filing Date: Feb. 21, 2017; dated Apr. 18, 2017; 7 pages.
Zeolite Structure, Framework Type Data, "Type Material: CHABAZITE," CHA, pp. 96-97.

* cited by examiner

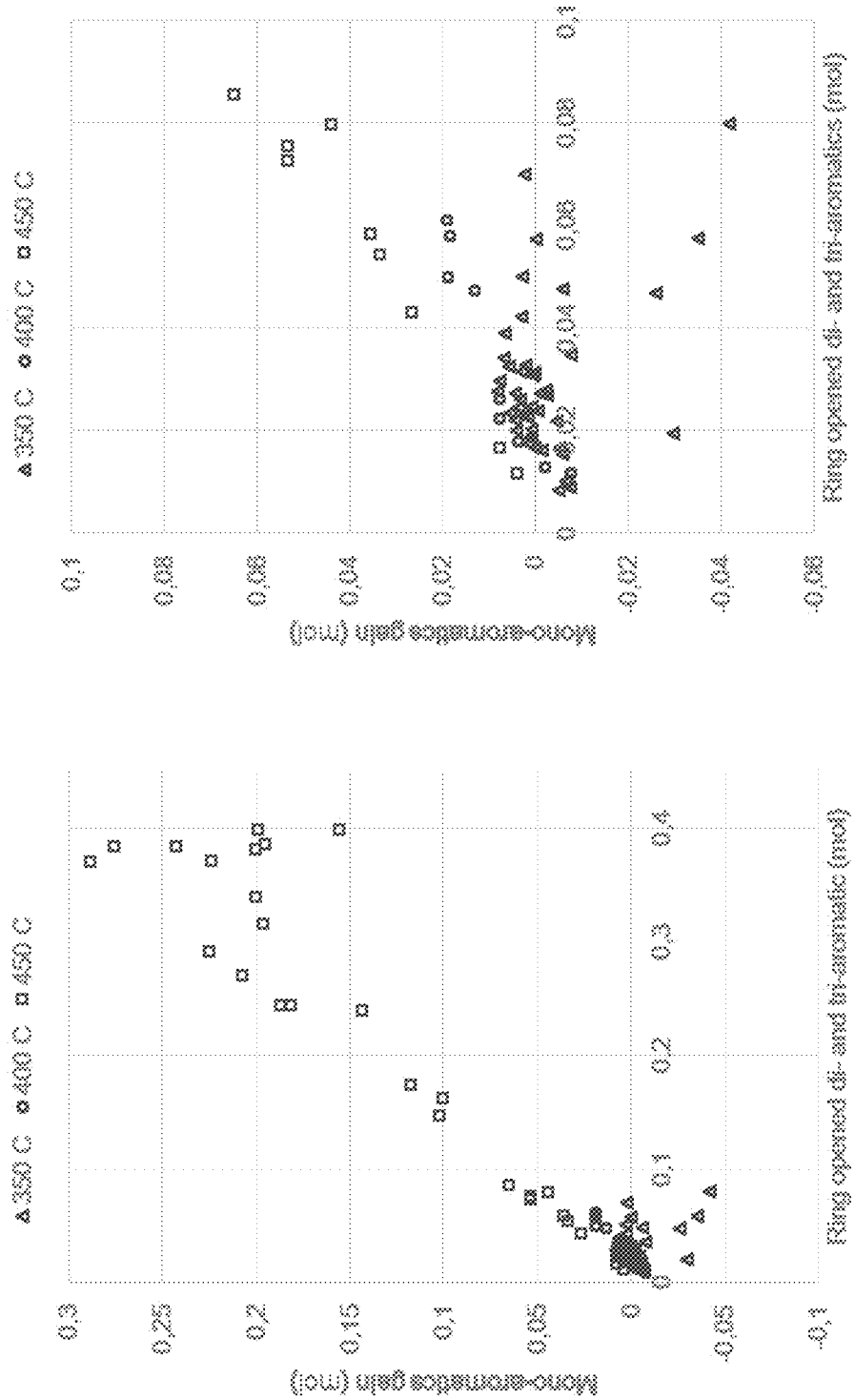

PROCESS FOR PRODUCING MONOAROMATIC HYDROCARBONS FROM A HYDROCARBON FEED COMPRISING POLYAROMATICS

CROSS REFERENCE TO RELATED APPLICATIONS

This application is a 371 of International Application No. PCT/EP2017/053866, filed Feb. 21, 2017, which claims priority to European Application Serial No. 16157968.5, filed Mar. 1, 2016, which are incorporated herein by reference in their entirety.

BACKGROUND OF THE INVENTION

Field of the Invention

The present invention relates to a process for producing monoaromatic hydrocarbons from a hydrocarbon feed comprising polyaromatics, the process comprising contacting the feed at process conditions with a catalyst comprising a mixture of zeolite Y and a hydrogenation catalyst comprising one or more hydrogenation metals on a solid catalyst support.

Description of Related Art

Processes for producing monoaromatic hydrocarbons from heavy hydrocarbon feeds have been previously described. For instance, US 2007/0062848 describes a process for hydrocracking a feed comprising not less than 20 weight % of one or more aromatic compounds containing at least two fused aromatic rings to produce a product stream comprising C2-4 alkanes and BTX comprising an aromatic hydrogenation step and a separate ring cleavage step.

Ma et al. (2007) Catal Letters 116, 149-154 describe the coupled hydrogenation and ring opening of tetralin on potassium modified Pt/zeolite Y catalysts. The process of Ma et al. is characterized in that the BTX yield is relatively low. Ma et al. (2007) shows that the extent of successive cracking reactions can be reduced by introducing potassium into a Pt/zeolite Y catalyst. As a result thereof, however, the process of Ma et al. (2007) has a relatively high selectivity for non-aromatic C5-C9 hydrocarbons.

U.S. Pat. No. 4,305,808 describes catalytic hydrocracking of polynuclear aromatic containing feedstocks over catalysts comprising zeolites in intimate contact with a nickel-tungsten hydrogenation component. Said zeolites are characterized by a silica to alumina mole ratio of at least 12, a constraint index with the approximate range of 1 to 12 and an alpha value of between about 25 and 200. U.S. Pat. No. 4,305,808 fails to describe a process using zeolite Y.

U.S. Pat. No. 6,444,865 describes a catalyst comprising form 0.1 to 15 wt-% of a noble metal selected from one or more of Pt, Pd and Ir, from 2 to 40 wt-% Mn and/or Rh supported on an acid carrier. U.S. Pat. No. 6,444,865 further describes use of this catalyst in a process wherein a hydrocarbon feedstock comprising aromatic compounds is contacted with the catalyst at elevated temperature and pressure in the presence of hydrogen. U.S. Pat. No. 6,444,865 fails to describe a process using a catalyst comprising a mixture of zeolite Y and a hydrogenation catalyst comprising one or more hydrogenation metals on a solid catalyst support.

EP 0 247 678 A2 describes a process for converting hydrocarbon oils into products of lower average molecular weight an lower average boiling point comprising contacting a hydrocarbon oil at elevated temperature and pressure in the presence of hydrogen with a catalyst comprising a specific modified Y zeolite, an amorphous cracking component, a binder and at least one hydrogenation component of a Group VI metal and/or at least one hydrogenation component of a Group VIII metal. EP 0 247 678 A2 fails to describe a process using a catalyst comprising a mixture of zeolite Y and a hydrogenation catalyst comprising one or more hydrogenation metals on a solid catalyst support.

EP 0 512 652 A1 describes a process for reducing the amount of cyclic structures present in a gas oil. Which process comprises contacting a gas oil with hydrogen at elevated temperature and pressure using a catalyst comprising one or more Group VIII noble metal(s) on a support, wherein the support comprises a modified Y-type zeolite. Also EP 0 512 652 A1 fails to describe a process using a catalyst comprising a mixture of zeolite Y and a hydrogenation catalyst comprising one or more hydrogenation metals on a solid catalyst support.

It was an object of the present invention to provide an improved process which allows the selective conversion of a heavy hydrocarbon feedstock comprising polyaromatics to monoaromatic hydrocarbons and which has a low selectivity towards unwanted side-products such as methane and/or lower paraffinic hydrocarbons such as LPG and non-aromatic C5-C9 hydrocarbons.

BRIEF SUMMARY OF THE INVENTION

The solution to the above problem is achieved by providing the embodiments as described herein below and as characterized in the claims. Accordingly, the present invention provides a process for producing monoaromatic hydrocarbons from a hydrocarbon feed comprising polyaromatics, the process comprising contacting the feed at process conditions comprising a temperature of 350-550° C., a pressure of 2000-7000 kPa, a WHSV of 0.1-10 h$^{-1}$ and a H$_2$/HC molar ratio of 3-12 with a catalyst comprising a mixture of zeolite Y having a SiO$_2$/Al$_2$O$_3$ ratio of 10-80 and a hydrogenation catalyst comprising one or more hydrogenation metals on a solid catalyst support, wherein said hydrogenation catalyst is selected from the group consisting of:
a catalyst comprising: 1-30 wt-% based on the total weight of the hydrogenation catalyst of Mo and/or W and 0.1-10 wt-% based on the total weight of the hydrogenation catalyst of Co and/or N; and
a catalyst comprising 0.05-2 wt-% based on the total weight of the hydrogenation catalyst of one or more elements selected from Groups 8-10 of the Periodic Table of Elements.

BRIEF DESCRIPTION OF THE DRAWINGS

FIG. 1 summarizes the results obtained for different catalyst systems, pressures and space velocities at temperatures of 350, 400 and 450° C.

DETAILED DESCRIPTION OF THE INVENTION

In the context of the present invention, it was surprisingly found that by specifically selecting the catalyst comprising a mixture of zeolite Y and a hydrogenation catalyst of the present invention and selecting a temperature of 350-550° C., a pressure of 2000-7000 kPa, a WHSV of 0.1-10 h$^{-1}$ and a H$_2$/HC molar ratio of 3-12 as process conditions, a heavy hydrocarbon feed comprising polyaromatic hydrocarbon compounds can be more efficiently converted to monoaromatic hydrocarbons. Particularly, the production of unwanted side products such as methane and/or C5-C9 hydrocarbons can be reduced by selecting the process conditions as defined herein in combination with the catalyst of the present invention over a catalyst and process conditions as described in the prior art, such as Ma et al, which for instance involves a process temperature of 100-300° C.

The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the $^1$H NMR spectrum, for example the presence of chemical shifts in the range of from 7.2 to 7.3 ppm for benzene ring protons. As used herein, the term "polyaromatics" or "polyaromatic hydrocarbons" relates to a mixture of aromatic hydrocarbons having more than one aromatic ring. As used herein, the term "monoaromatic hydrocarbons" or "monoaromatics" relates to a mixture of aromatic hydrocarbons having only one aromatic ring.

The term "BTX" as used herein relates to a mixture of benzene, toluene and xylenes.

As used herein, the term "C# hydrocarbons", or "C#", wherein "#" is a positive integer, is meant to describe all hydrocarbons having # carbon atoms. Moreover, the term "C#+ hydrocarbons" is meant to describe all hydrocarbon molecules having # or more carbon atoms. Accordingly, the term "C9+ hydrocarbons" is meant to describe a mixture of hydrocarbons having 9 or more carbon atoms. The term "C9+ alkanes" accordingly relates to alkanes having 9 or more carbon atoms.

The term "LPG" as used herein refers to the well-established acronym for the term "liquefied petroleum gas". LPG generally consists of a blend of C2-C4 hydrocarbons i.e. a mixture of C2, C3, and C4 hydrocarbons.

The present invention provides a process for producing monoaromatic hydrocarbons from a hydrocarbon feed comprising polyaromatics.

The term "hydrocarbon feed" as used herein relates to the hydrocarbon mixture that is subjected to the process of the present invention. As used herein, the term "heavy hydrocarbon" is used in its generally accepted meaning in the field of petroleum refinery processes. Preferably, the heavy hydrocarbon feed relates to a mixed hydrocarbon feed that may be obtained after crude distillation or that may be derived from a refinery unit having a boiling point of more than 340° C., more preferably of more than 350° C. Preferably, the heavy hydrocarbon feed comprises at least 30 wt-% polyaromatics, preferably at least 50 wt-% polyaromatics.

The heavy hydrocarbon feed may comprise sulfur. In the event the hydrogenation catalyst is a catalyst comprising one or more elements selected from Groups 8-10 of the Periodic Table of Elements, the heavy hydrocarbon feed preferably comprises at most 200 wppm sulfur (i.e. the weight of sulfur atoms, present in any compound, in relation to the total weight of the feed), preferably at most 100 wppm sulfur, more preferably at most 50 wppm sulfur and most preferably at most 20 wppm sulfur. In the event the hydrogenation catalyst is a catalyst comprising Mo and/or W and Co and/or Ni, the heavy hydrocarbon feed preferably comprises at least 10 wppm sulfur (i.e. the weight of sulfur atoms, present in any compound, in relation to the total weight of the feed), preferably at least 20 wppm sulfur, more preferably at least 50 wppm sulfur and most preferably at least 100 wppm sulfur. Methods for the measurement of the sulfur content in a hydrocarbons stream are well known. Preferably, the sulfur content is measured using the IP 490 standard; see also ISO 20846:2011. Accordingly, samples are introduced into a pyrolysis furnace, where the sample is oxidised at high temperature in an oxygen atmosphere. All sulfur in the sample is oxidised to $SO_2$. The $SO_2$ is exposed to ultraviolet light, causing it to fluoresce. The light emitted by the fluorescence is detected by a photomultiplier, and the resulting signal is proportional to the sulphur content of the sample.

Preferably, hydrocarbon feed is selected from the group consisting of heavy cycle oil, light cycle oil, carbon black oil, cracked distillate and pyoil.

The process of the present invention comprises contacting the heavy hydrocarbon feed in the presence of hydrogen at process conditions comprising a temperature of 350-550° C., a pressure of 2000-7000 kPa, a WHSV of 0.1-10 h$^{-1}$ and a $H_2$/HC molar ratio of 3-12 with a catalyst.

Preferably, the process conditions comprise a temperature of 400-475° C.

One of the characterizing features of the process of the present invention is that the catalyst is a mixture of two different catalysts, i.e. a mixture of zeolite Y and of a hydrogenation catalyst. The zeolite Y is characterized in that it has a $SiO_2/Al_2O_3$ ratio of 10-80. The hydrogenation catalyst comprising one or more hydrogenation metals on a solid catalyst support, wherein said hydrogenation catalyst is selected from the group consisting of:

a catalyst comprising: 1-30 wt-% based on the total weight of the hydrogenation catalyst of Mo and/or W and 0.1-10 wt-% based on the total weight of the hydrogenation catalyst of Co and/or N; and a catalyst comprising 0.05-2 wt-% based on the total weight of the hydrogenation catalyst of one or more elements selected from Groups 8-10 of the Periodic Table of Elements.

Preferably, the catalyst composition used in the process of the present invention is a mixture comprising 10-90 wt-% zeolite Y and 10-90 wt-% hydrogenation catalyst, more preferably the catalyst composition used in the process of the present invention is a mixture comprising 20-80 wt-% zeolite Y and 20-80 wt-% hydrogenation catalyst, even more preferably the catalyst composition used in the process of the present invention is a mixture comprising 30-70 wt-% zeolite Y and 30-70 wt-% hydrogenation catalyst, most preferably the catalyst composition used in the process of the present invention is a mixture comprising 40-60 wt-% zeolite Y and 40-60 wt-% hydrogenation catalyst.

Preferably, the zeolite Y has a $SiO_2/Al_2O_3$ ratio of 10-40, the hydrogenation catalyst comprises 1-30 wt-% based on the total weight of the hydrogenation catalyst of Mo and/or W and 0.1-10 wt-% based on the total weight of the hydrogenation catalyst of Co and/or Ni and the process conditions comprise a pressure of 2000-7000 kPa.

Preferably, the zeolite Y has a $SiO_2/Al_2O_3$ ratio of 40-80, the hydrogenation catalyst comprises 0.05-2 wt-% based on the total weight of the hydrogenation catalyst of one or more elements selected from Groups 8-10 of the Periodic Table of Elements and the process conditions comprise a pressure of 4000-7000 kPa.

Accordingly, the catalyst mixture used in the process of the present invention comprises the well-known aluminosilicate zeolite "zeolite Y". Zeolites are well-known molecular sieves having a well-defined pore size. As used herein, the term "zeolite" or "aluminosilicate zeolite" relates to an aluminosilicate molecular sieve. An overview of their characteristics is for example provided by the chapter on Molecular Sieves in Kirk-Othmer Encyclopedia of Chemical Technology, Volume 16, p 811-853; in Atlas of Zeolite Framework Types, 5th edition, (Elsevier, 2001).

Depending on the silica-to-alumina molar ratio ("SiO$_2$/Al$_2$O$_3$ molar ratio" or "SiO$_2$/Al$_2$O$_3$ ratio") of their framework, synthetic faujasite zeolites are divided into zeolite X and zeolite Y. In X zeolites the SiO$_2$/Al$_2$O$_3$ ratio is between 2 and 3, while in Y zeolites it is 3 or higher. Accordingly, zeolite Y is a synthetic faujasite zeolite having a SiO$_2$/Al$_2$O$_3$ ratio in their framework of 3 or more. Preferably, the zeolite in the catalyst is in the so-called hydrogen form, meaning that its sodium or potassium content is very low, preferably below 0.1, 0.05, 0.02 or 0.01 wt-%; more preferably presence of sodium is below detection limits.

The zeolite Y as used in the process of the present invention may comprise further components such as a binder. Known binders include, but are not limited to silica, alumina and clay, such as kaolin. Alumina (Al$_2$O$_3$) is a preferred binder. The zeolite Y of the present invention preferably comprises at least 10 wt-%, most preferably at least 20 wt-% binder and preferably comprises up to 40 wt-% binder.

The zeolite Y catalyst is preferably formed into shaped catalyst particles by any known technique, for instance by extrusion.

The zeolite Y used in the process of the present invention has a SiO$_2$/Al$_2$O$_3$ ratio of 10-80, preferably a SiO$_2$/Al$_2$O$_3$ ratio of 10-40 or a SiO$_2$/Al$_2$O$_3$ ratio of 40-80 and thus is partially dealuminated. Preferably, the partially dealuminated zeolite is prepared by controlling SiO$_2$/Al$_2$O$_3$ ratio during zeolite synthesis. Alternatively, the zeolite may be partially dealuminated by a post-synthesis modification. Means and methods to obtain dealuminated zeolite by post-synthesis modification are well known in the art and include, but are not limited to the acid leaching technique; see e.g. Post-synthesis Modification I; Molecular Sieves, Volume 3; Eds. H. G. Karge, J. Weitkamp; Year (2002); Pages 204-255. Preferably, the zeolite Y comprises super cages having a size of 12-14 Å. Means and methods for preparing zeolites comprising super cages are well-known in the art and comprise zeolite post-treatments such as acid leaching and steaming, among others. (Angew. Chem., Int. Ed. 2010, 49, 10074, ACS nano, 4 (2013) 3698).

Hydrogenation catalysts are well known in the art and generally comprise one or more hydrogenation metals. Such hydrogenation metals are well-known in the art and may comprise one or more transition metals in metal, oxide or sulfide form, for instance one or more elements selected from the group consisting of Pd, Rh, Ru, Ir, Os, Cu, Co, Ni, Pt, Fe, Zn, Ga, In, Mo, W and V, supported on a catalyst support. The hydrogenation catalyst used in the present invention does not have acid function. Accordingly, the catalyst support of the hydrogenation catalyst of the present invention is a non-acidic catalyst support. Typical non-acidic catalyst supports include, but are not limited to, carbon, alumina, and silica. The preferred hydrogenation catalyst support in the context of the present invention is alumina. Preferably, the hydrogenation catalyst comprises 3-20 wt-% based on the total weight of the hydrogenation catalyst of Mo and/or W and 0.7-7 wt-% based on the total weight of the hydrogenation catalyst of Co and/or Ni. Preferably, the hydrogenation catalyst comprises one or more selected from the group consisting of: Co and Mo; Ni and Mo; Ni and W; and Co and W. Preferably, the hydrogenation catalyst comprises Mo and/or W and Co and/or Ni in sulfide form.

Preferably, the hydrogenation catalyst comprises one or more selected from the group consisting of CoMoS$_2$, NiMoS$_2$, NiWS$_2$ and CoWS$_2$.

In a further embodiment, the hydrogenation catalyst comprises 0.1-1.25 wt-% based on the total weight of the hydrogenation catalyst of one or more elements selected from Groups 8-10 of the Periodic Table of Elements. Preferably, the one or more elements selected from Groups 8-10 of the Periodic Table of Elements is Pd and/or Pt, preferably Pt.

The process of the present invention produces monoaromatic hydrocarbons as a process product. Preferably, the process of the present invention produces at least 20 wt-% monoaromatic hydrocarbons of the total hydrocarbon process product, more preferably at least 25 wt-% monoaromatic hydrocarbons of the total hydrocarbon process product, and most preferably at least 30 wt-% monoaromatic hydrocarbons of the total hydrocarbon process product. Preferably, the process of the present invention produces less than 1.5 wt-% methane of the total hydrocarbon process product, more preferably less than 1 wt-% methane of the total hydrocarbon process product and most preferably less than 0.5 wt-% methane of the total hydrocarbon process product.

It is noted that the invention relates to all possible combinations of features described herein, particularly features recited in the claims.

It is further noted that the term "comprising" does not exclude the presence of other elements. However, it is also to be understood that a description on a product comprising certain components also discloses a product consisting of these components. Similarly, it is also to be understood that a description on a process comprising certain steps also discloses a process consisting of these steps.

Example

Catalyst Preparation
Physical Mixture Catalyst:

All catalyst mixtures are based on a 1:1 or a 1:2 weight ratio of the hydrogenation catalyst and the zeolite Y. Particle size of all catalysts was in the order of 100 to 150 μm and obtained by ball milling and sieving. As the zeolite was available as a powder it first had to be bounded with alumina to increase the particle size. This was done by using Disperal®. The procedure is as follows: Zeolite, Disperal and water are mixed in 7:3:40 weight ratio respectively. The slurry is then ball milled for 15 minutes at 600 rpm with balls of 1.3 mm diameter. After milling the slurry is dried at 120° C. in an open beaker after which the particles are transferred into a hotbox for overnight drying at 110° C. The next day the material was calcined at 300° C. for 6 hours.
Experimental Set-Up The loading of catalysts into the reactor was done carefully in order to obtain a homogeneous mixture. The following catalysts were used: hydrogenation catalyst: UOP R12 (commercially available) and zeolite Y: Zeolyst CBV780 and CBV712 (both commercially available).
Catalyst Activation:

All catalyst mixtures were activated in situ. First the reactor was purged with nitrogen up to 60° C. Then a flow of hydrogen was introduced and the reactor was heated at 1° C./min to a temperature of 400° C. This temperature was maintained for 2 hours before the reactor was allowed to cool in hydrogen flow.

Tests have been performed to process in a single step a di- and tri-aromatics containing hydrocarbon stream into monoaromatics and LPG. To mimic Light Cycle Oil (LCO) a model feed was used with the composition given in Table 1. All experiments were performed with a 10 to 1 hydrogen to hydrocarbon molar ratio.

TABLE 1

Model feed composition details.
Model Feed

| | |
|---|---|
| Decane | 25 wt % |
| Propylbenzene | 20 wt % |
| Naphthalene | 25 wt % |
| 1-Methylnaphthalene | 15 wt % |
| 2-Methylnaphthalene | 10 wt % |
| Anthracene | 2 wt % |
| Phenantrene | 3 wt % |

The model feed was exposed to different catalyst mixtures (UOP R12 and CBV712 with both 1:1 and 1:2 weight ratio, UOP R12 and CBV780 with 1:1 weight ratio) in a single fixed bed at 30, 60 and 100 bars and temperatures ranging from 250 to 450° C. in a 16 parallel reactor setup. FIG. 1 summarizes the results obtained for different catalyst systems, pressures and space velocities at temperatures of 350, 400 and 450° C. The plot shows the number of moles of mono-aromatics gained vs. the number of moles of ring opened di- and tri-aromatics. If the ratio of the two is 1:1 the mono-aromatics selectivity is 100%. That means that each multi ring component being ring opened results in the yield of a mono-aromatic component.

The results were calculated using the following formulas:

Monoaromatics gain=monoaromatics$_{out}$-monoaromatics$_{in}$

Ring openeed di- and triaromatics=diaromatics$_{in}$+triaromatics$_{in}$-any component consisting of 2 or more rings$_{out}$ Ring opening conversion=(diaromatics$_{in}$+triaromatics$_{in}$-any component consisting of 2 or more rings$_{out}$)/(diaromatics$_{in}$+triaromatics$_{in}$)

Monoaromatics selectivity=monoaromatics gain/ring opened di- and triaromatics=(monoaromatics$_{out}$-monoaromatics$_{in}$)/(diaromatics$_{in}$+triaromatics$_{in}$-any component consisting of 2 or more rings$_{out}$)

The monoaromatics gain is defined as the amount of moles of monoaromatics in the reactor effluent minus the amount of moles of monoaromatics present in the feed per quantity of feed processed.

The amount of ring openened di- and tri-aromatics is defined as the amount in moles of di-aromatics and tri-aromatics present in the feed minus the total amount in moles of any component having two or more rings present in the effluent per quantity of feed processed.

The ring opening conversion is obtained by dividing the difference in moles of di-aromatics plus triaromatics present in the feed and the total amount in moles of any component having two or more rings present in the effluent, by the amount in moles of di-aromatics plus tri-aromatics present in the feed Monoaromatics selectivity is defined as the monoaromatics gain (as defined before) divided by the amount of ring openened di- and triaromatics (as defined before)

FIG. 1 describes the mono-aromatics gain versus extent of ring opening for catalyst mixtures at three different temperatures. The plot on right is a zoom on the low conversion range. The data from the experiment at highest temperature (450° C.) gives the steepest slope indicating that the selectivity towards mono-aromatics is highest at this temperature.

TABLE 2

Ring opening conversion and mono-aromatics selectivity for various pressure/temperature combinations. For each condition the highest mono-aromatics gain (grey line) case was selected.

| Reaction conditions | Ring open conversion (%) | Monoaromatics selectivity (mol %) | Monoaromatics gain (w %) |
|---|---|---|---|
| 350 C., 30 bar | 6.9 | 29.2 | 0.9 |
| 350 C., 60 bar | 8.5 | 20.1 | 0.6 |
| 350 C., 100 bar | 7.9 | 9.5 | 0.2 |
| 400 C., 30 bar | 15.3 | 30.9 | 1.7 |
| 450 C., 30 bar | 36.8 | 69.4 | 8.2 |
| 450 C., 60 bar | 92.8 | 77.7 | 20.4 |
| 450 C., 100 bar | 96.2 | 63.1 | 15.3 |

Table 2 gives an overview of the cases of highest monoaromatics yield for each individual pressure/temperature combination tested. This means that results can be obtained with different catalysts and weight hourly space velocities. Activity increases with both an increase in temperature as an increase in pressure. However, higher pressures tend to cause a decrease in selectivity towards aromatics saturation. The optimum combination is found for the system tested at 60 bars and 450° C. which has the highest mono-aromatics yield: a gain of 20 w %.

TABLE 3

Ring opening conversion and mono-aromatics selectivity at 450° C. for two zeolite Y acidities and pressures of 60 and 30 bars.

| Used zeolite Si/Al$_2$ ratio and reaction pressure | Ring open conversion (%) | Monoaromatics selectivity (mol %) |
|---|---|---|
| Si/Al$_2$ = 80, 60 bar | 92.8 | 77.7 |
| Si/Al$_2$ = 12, 60 bar | 72.9 | 77.1 |
| Si/Al$_2$ = 12, 60 bar | 67.9 | 76.3 |
| Si/Al$_2$ = 80, 30 bar | 36.8 | 69.4 |
| Si/Al$_2$ = 12, 30 bar | 21.5 | 75.5 |
| Si/Al$_2$ = 12, 30 bar | 18.2 | 73.0 |

Table 3 shows results on activity and selectivity when zeolites with two different SiO$_2$/Al$_2$O$_3$ ratios are used. The effect on selectivity is only marginal whereas there is a clear activity advantage for catalyst mixtures using the zeolite Y with a SiO$_2$/Al$_2$O$_3$ ratio of 80. Therefore, the use of this zeolite will result in the highest mono-aromatics yields.

The invention claimed is:

1. A process for producing monoaromatic hydrocarbons from a hydrocarbon feed comprising polyaromatics, the process comprising:
   contacting the feed at process conditions comprising a temperature of 350-550° C., a pressure of 2000-7000 kPa, a WHSV of 0.1-10 h$^{-1}$ and a H$_2$/HC molar ratio of 3-12, with a catalyst system comprising a physical mixture of
   particles comprising zeolite Y having a SiO$_2$/Al$_2$O$_3$ ratio of 40-80 and a binder and
   particles comprising a hydrogenation catalyst comprising a hydrogenation metal on a solid catalyst support,
   wherein the particles comprising zeolite Y differ from the particles comprising the hydrogenation catalyst, and
   wherein said hydrogenation catalyst is selected from the group consisting of:
   a catalyst comprising 1-30 wt-% of Mo and/or W, based on a total weight of the hydrogenation catalyst, and 0.1-10 wt-% of Co and/or Ni, based on the total weight of the hydrogenation catalyst; and
a catalyst comprising 0.05-2 wt-% of an element selected from Groups 8-10 of the Periodic Table of Elements, based on the total weight of the hydrogenation catalyst.

2. The process according to claim 1, wherein the process conditions comprise a temperature of 400-475° C.

3. The process according to claim 1, wherein the hydrogenation catalyst comprises 0.05-2 wt-%, based on the total weight of the hydrogenation catalyst, of one or more elements selected from Groups 8-10 of the Periodic Table of Elements, and the process conditions comprise a pressure of 4000-7000 kPa.

4. The process according to claim 1, wherein the hydrogenation catalyst comprises 3-20 wt-% of Mo and/or W based on the total weight of the hydrogenation catalyst and 0.7-7 wt-% of Co and/or Ni based on the total weight of the hydrogenation catalyst.

5. The process according to claim 1, wherein the hydrogenation catalyst comprises one or more selected from the group consisting of: Co and Mo; Ni and Mo; Ni and W; and Co and W.

6. The process according to claim 1, wherein the hydrogenation catalyst comprises Mo and/or W and Co and/or Ni in sulfide form.

7. The process according to claim 1, wherein the hydrogenation catalyst comprises 0.1-1.25 wt-% based on the total weight of the hydrogenation catalyst of an element selected from Groups 8-10 of the Periodic Table of Elements.

8. The process according to claim 7, wherein the element is Pd and/or Pt.

9. The process according to claim 1, wherein the element is Pd and/or Pt.

10. The process according to claim 1, wherein the zeolite Y comprises super cages having a size of 12-14 Å.

11. The process according to claim 1, wherein the hydrocarbon feed comprises at least 30 wt-% polyaromatics.

12. The process according to claim 1, wherein the hydrocarbon feed comprises at most 200 wppm sulfur.

13. The process according to claim 1, wherein the hydrocarbon feed is selected from the group consisting of heavy cycle oil, light cycle oil, carbon black oil, cracked distillate and pyoil.

14. The process according to claim 1, wherein the catalyst comprises 40-60 wt-% of the zeolite Y and 40-60 wt-% of the hydrogenation catalyst.

15. The process according to claim 1, wherein a product of the process comprises at least 20 wt-% monoaromatic hydrocarbons.

16. The process according to claim 1, wherein a product of the process comprises less than 1.5 wt-% methane.

17. A process for producing monoaromatic hydrocarbons from a hydrocarbon feed comprising polyaromatics, the process comprising:
contacting the feed at process conditions comprising a temperature of 400-475° C., a pressure of 4000-7000 kPa, a WHSV of 0.1-10 $h^{-1}$ and a $H_2$/HC molar ratio of 3-12, with a catalyst system comprising a physical mixture of
particles comprising zeolite Y having a s $SiO_2/Al_2O_3$ ratio of 40-80 and a binder and
particles comprising a hydrogenation catalyst comprising a hydrogenation metal on a solid catalyst support,
wherein the particles comprising zeolite Y differ from the particles comprising the hydrogenation catalyst, and
wherein said hydrogenation catalyst comprises 0.05-2 wt-% of an element selected from Groups 8-10 of the Periodic Table of Elements, based on a total weight of the hydrogenation catalyst.

18. The process according to claim 17, wherein the hydrogenation catalyst comprises 0.1-1.25 wt-% Pd and/or Pt.

* * * * *